May 22, 1956     I. M. ARCHER     2,746,401
DOUGH ROLLING MECHANISM OF A DOUGH MOLDING MACHINE
Filed July 28, 1950     8 Sheets-Sheet 1

Fig.1.

Inventor
Irving M. Archer
By Fishburn & Mullendore
Attorneys

May 22, 1956     I. M. ARCHER     2,746,401
DOUGH ROLLING MECHANISM OF A DOUGH MOLDING MACHINE
Filed July 28, 1950     8 Sheets-Sheet 2

Inventor
Irving M. Archer
By Fishburn & Mullendore
Attorneys

May 22, 1956

I. M. ARCHER 2,746,401

DOUGH ROLLING MECHANISM OF A DOUGH MOLDING MACHINE

Filed July 28, 1950

Inventor
Irving M. Archer
By Fishburn & Mullendore
Attorneys

May 22, 1956

I. M. ARCHER 2,746,401

DOUGH ROLLING MECHANISM OF A DOUGH MOLDING MACHINE

Filed July 28, 1950

Inventor
Irving M. Archer
By Fishburn & Mullendore
Attorneys

May 22, 1956   I. M. ARCHER   2,746,401
DOUGH ROLLING MECHANISM OF A DOUGH MOLDING MACHINE
Filed July 28, 1950   8 Sheets-Sheet 6

Inventor
Irving M. Archer
By Fishburn & Mullendore
Attorneys ized Patent Office 2,746,401
Patented May 22, 1956

2,746,401
DOUGH ROLLING MECHANISM OF A DOUGH MOLDING MACHINE

Irving M. Archer, Dallas, Tex.

Application July 28, 1950, Serial No. 176,447

6 Claims. (Cl. 107—9)

This invention relates to a dough rolling mechanism of a dough molding machine. It is the practice in bakeries to divide dough, after mixing, into pieces suitable for making individual loaves of bread. These pieces are then rolled into balls and passed through a proofing machine from where they are delivered into a molding machine in which the dough is sheeted for removing the gas and effecting a uniform or proper cell structure. After the dough has been sheeted to proper width and thickness, the sheets are rolled into a size and length to fit the baking pans in which the dough is subsequently baked.

Floor space in most bakeries is restricted. Consequently, the dough after proofing, is delivered to a single molding machine. This requires operation of the molding machine at speeds which do not permit proper sheeting of the dough, particularly when the bakery is operating at high capacity, for example, when making as many as seventy loaves of bread per minute. The objection to such an arrangement is readily apparent when it is considered that a piece of bread dough may be extended substantially indefinitely as long as it is drawn out gently and slowly. When the molding machine is speeded up to handle such a capacity, sudden pulls, and rapid working of the dough into sheets result in tearing of the surface of the pieces of dough. This results in excessively sticky dough which "sticks up" in the sheeting rolls, scrapers, belts, and other parts of the moulder unless an excessive amount of dusting flour is used. Even with heavy dusting, stick ups occur frequently in the usual molders. The introduction of raw dusting flour into the dough at the molder results in spirals, cores, streaks and similar blemishes in the finished bread product.

Sheeting of the dough must be slow enough to prevent any tears and rupture of the dough surfaces and yet the molding machine should have sufficient capacity to handle the output from the proofing machine.

It is therefore a principal object of the present invention to provide an improved dough rolling mechanism for a dough molding machine and which includes means for rolling up sheets of dough on a conveyor and a pressure board cooperating with the conveyor in properly rolling and shaping the rolls of dough for delivery to the baking pans within a relatively small area.

Other objects of the invention are to provide a pressure board that is adjustable angularly relatively to the dough conveyor for determining the pressure and time that the dough is rolled and worked while being acted upon by the pressure board, to provide an adjustable support for the pressure board wherein the board is adapted to move from the conveyor in case larger rolls known as doubles happen to pass thereunder, to provide an endless belt in association with the pressure board to cooperate with the conveyor in controlling movement of the rolls of dough, and to provide driving means for actuating the dough carrying conveyor and the belt at different speeds to cooperate with the variable angularity of the pressure board in controlling the time that the dough is retained under the pressure board.

In accomplishing these and other objects of the invention hereinafter pointed out, I have provided an improved structure, the preferred form of which is illustrated in the accompanying drawings, wherein.

Referring more in detail to the drawings:

1 designates a dough molding machine constructed in accordance with the present invention and which includes an elongated base 2 extending the full length of the machine and having closed sides and ends 3—4 and 5—6, forming an enclosure for a motor 7, a speed reduction unit 8, as well as the various driving connections leading therefrom as later to be described.

Figures 4, 7:
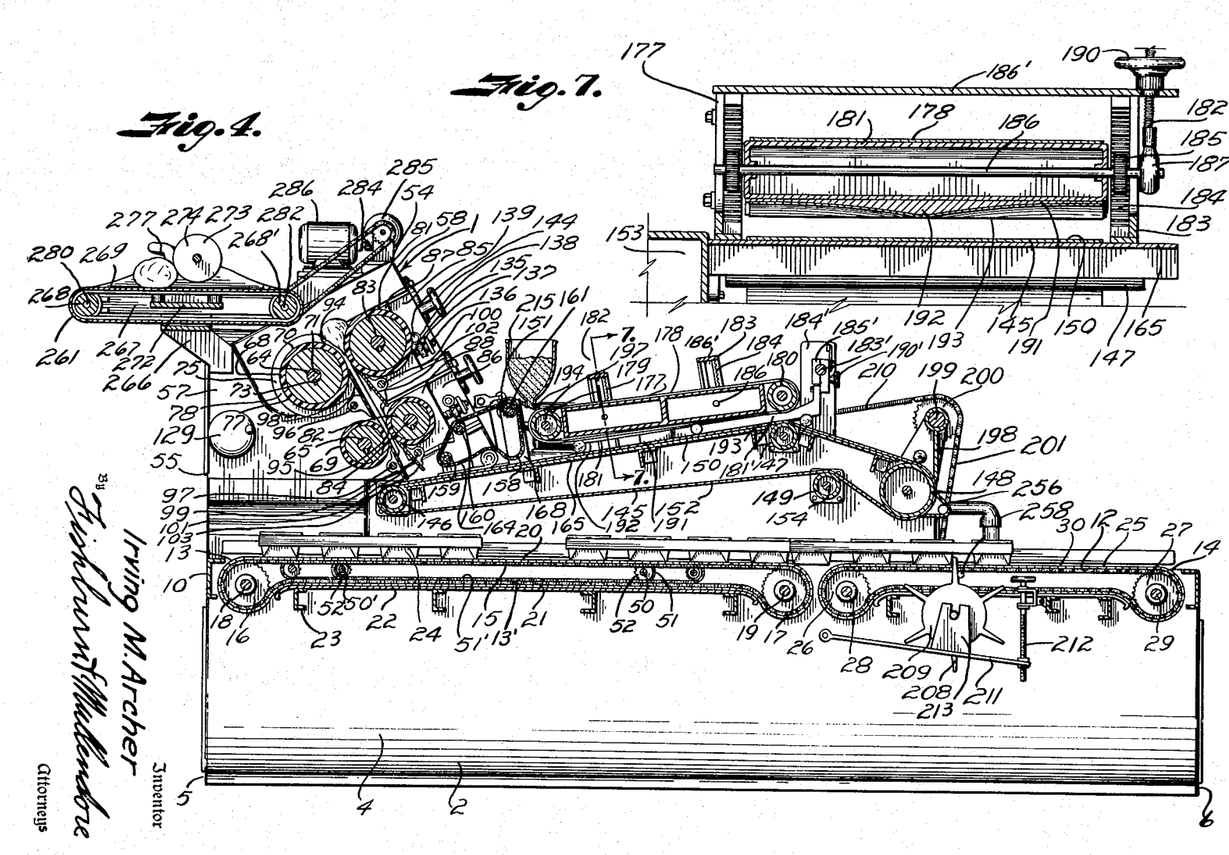
Fig. 4 is a longitudinal section through the dough sheeting and rolling mechanisms on the line 4—4 of Fig. 1.
Fig. 7 is a cross section through one of the dough rolling mechanisms on the line 7—7 of Fig. 4.

Extending laterally from the respective sides of the base 2 are horizontally arranged tables 9 and 10, having open ways 11 and 12 each containing tandem conveyors 13 and 14 respectively. These conveyors preferably consist of a plurality of interconnected metal plates 13' having their lateral edges secured to the links of sprocket chains 15 and 25 of the conveyors to better withstand wear of pans that are carried thereon. The plates 13' have adjacent side edges provided with tongues and groove portions and are connected by pintles (not shown), however the specific form of the connections are not a part of the present invention. The foremost conveyors 13 extend entirely across the width of the ways and the chains 15 thereof operate over sprockets 16 and 17 that are mounted on transverse shafts 18 and 19, the ends of the shafts being carried in opposite sides of the tables so that the upper runs 20 operate substantially in the same plane with the table tops. The pintles connecting the links of sprocket chains 15 fit into the teeth of sprockets 16 and 17, sprocket 17 being driven as hereinafter described. The lower runs 21 of the belts are supported on guides 22 that are carried by transverse supports 23 as best shown in Fig. 4. The conveyors 13 extend substantially the full length of the molding, dough rolling, and pressing mechanisms as later described, and carry sets of strapped baking pans 24 from the entrance end of the machine and on to the conveyors 14.

The conveyors 14 are of split construction and are similar in construction to the conveyors 13, the chains 25 thereof are laterally spaced apart and operate over pairs of sprockets 26 and 27, the sprockets being carried on transverse shafts 28 and 29 which are mounted similar to the shafts 18 and 19 to support the upper runs 30 of the chains 25 in the same plane with the upper runs 20 of the conveyors 13.

Figures 3, 6:
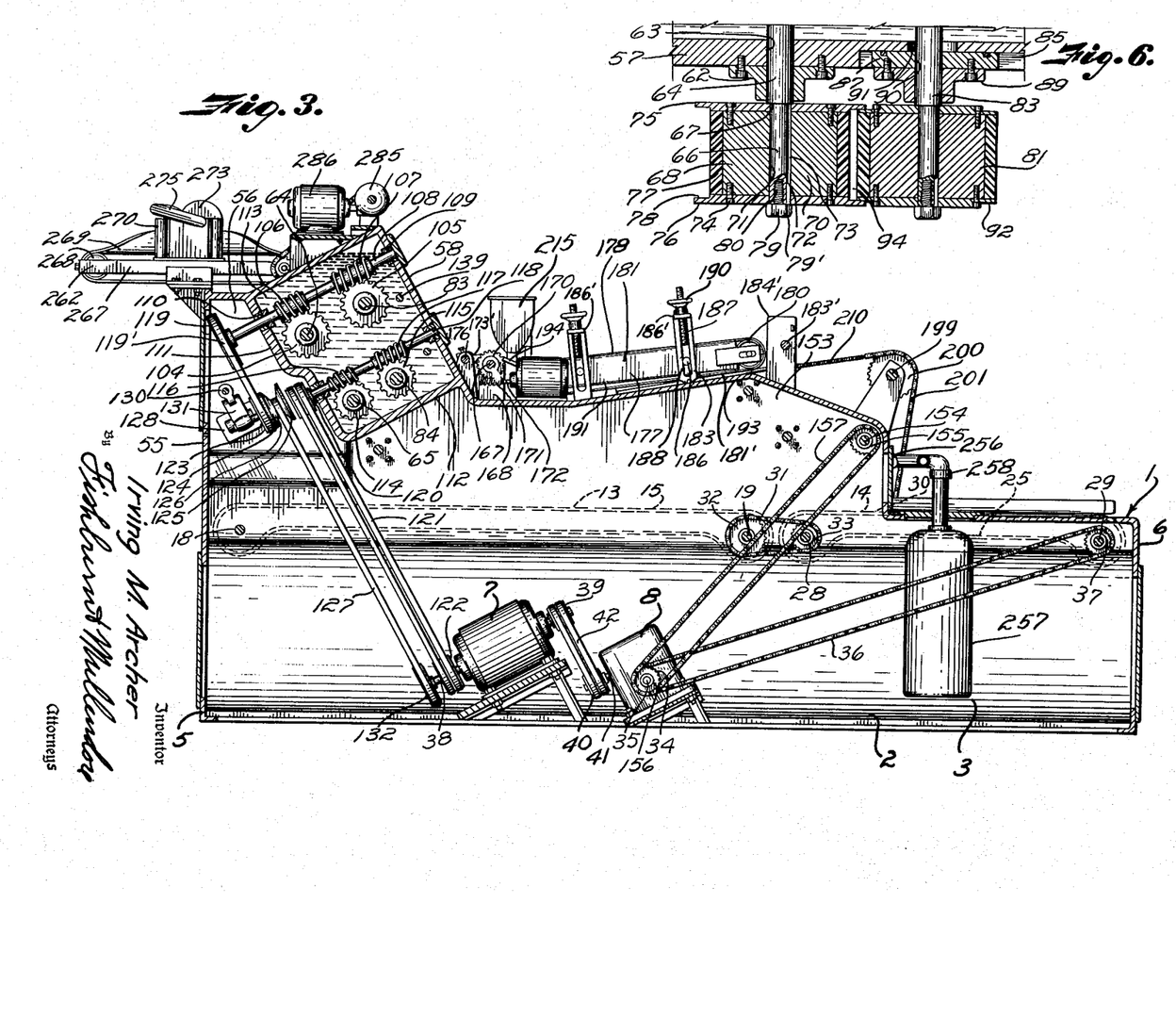
Fig. 3 is a central longitudinal section through the machine on the line 3—3 of Fig. 1, particularly illustrating the driving mechanisms.
Fig. 6 is a detailed section through a pair of sheeting rolls on the line 6—6 of Fig. 2.

The shafts 19 and 28 are interconnected by a chain 31 operating over sprockets 32 and 33 on the respective shafts 19 and 28 as best shown in Fig. 3. The conveyors are operated from a sprocket 34 on the power shaft 35 of the speed reduction mechanism 8 by means of a chain 36 operating over the sprocket 34 and over a sprocket 37 on the shaft 29. The motor 7 has an armature shaft 38 carrying multigrooved pulley 39 registering with a similar pulley 40 on the driving shaft 41 of the speed reduction unit 8 and which pulleys are connected in driving relation by belts 42 as shown in Fig. 3.

Figure 10:
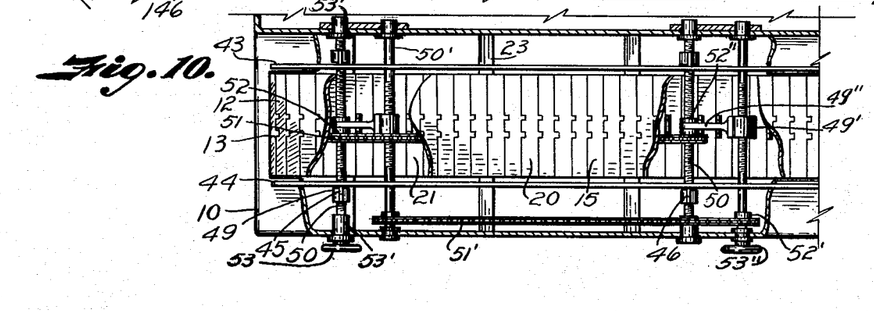
Fig. 10 is a detail plan view of the adjusting mechanism for the pan guides.

The sets of strapped pans 24 are guided along the respective tables between longitudinal guides 43 and 44 that are adjustably mounted at the sides of the conveyors in accordance with the length of pans being used. The guides are supported on arms 45 and 46 that extend through slots 47 in the table tops and are carried on sleeves 49 which are threadably mounted respectively on right and left threaded sections of transverse screw shafts 50 as shown in Fig. 10. The shafts 50 are interconnected by chains 51 operating over sprockets 52 that are fixed to the respective shafts so that both of the shafts may be rotated by a single hand wheel 53 to correspondingly move the arms 45 and 46 and guides to and from each other so that the spacing therebetween conforms to the pans. It is also desirable to adjust simultaneously both guides laterally so that the centers of the pans are in position to receive the rolls of dough centrally therein. This is effected by slideably mounting the ends of the shafts 50 within bushings 53' that are carried in the sides of the base as shown in Fig. 10. Mounted adjacent each shaft 50 is a positioning shaft 50' that is rotatably mounted in the sides of the frame but restrained from longitudinal movement. The shafts 50' are inter-connected by chains 51' operating over sprockets 52' that are fixed to the respective shafts so that when one of the shafts is rotated by a hand wheel 53" thereon both shafts are rotated to adjust the center alignment of the guides. The shafts 50' are threaded and carry nuts 49' that have arms 49" engaging within the grooves of collars 52" fixed to the shafts 50. It is thus obvious that rotation of the shafts 50' shifts the shafts 50 endwise until the guides are in posiion to retain the pans so that the rolled dough drops centrally therein as later described.

Extending upwardly from the center of the machine at the entrance end thereof is a gear housing 54 having an end wall 55 located in substantial alignment with the wall 5 of the base and having side walls 56 and 57, connected by an inclined end wall 58 and a top 59, all located above the tables to form a support for the molding rolls and their drive gearings as now to be described.

Figure 1:
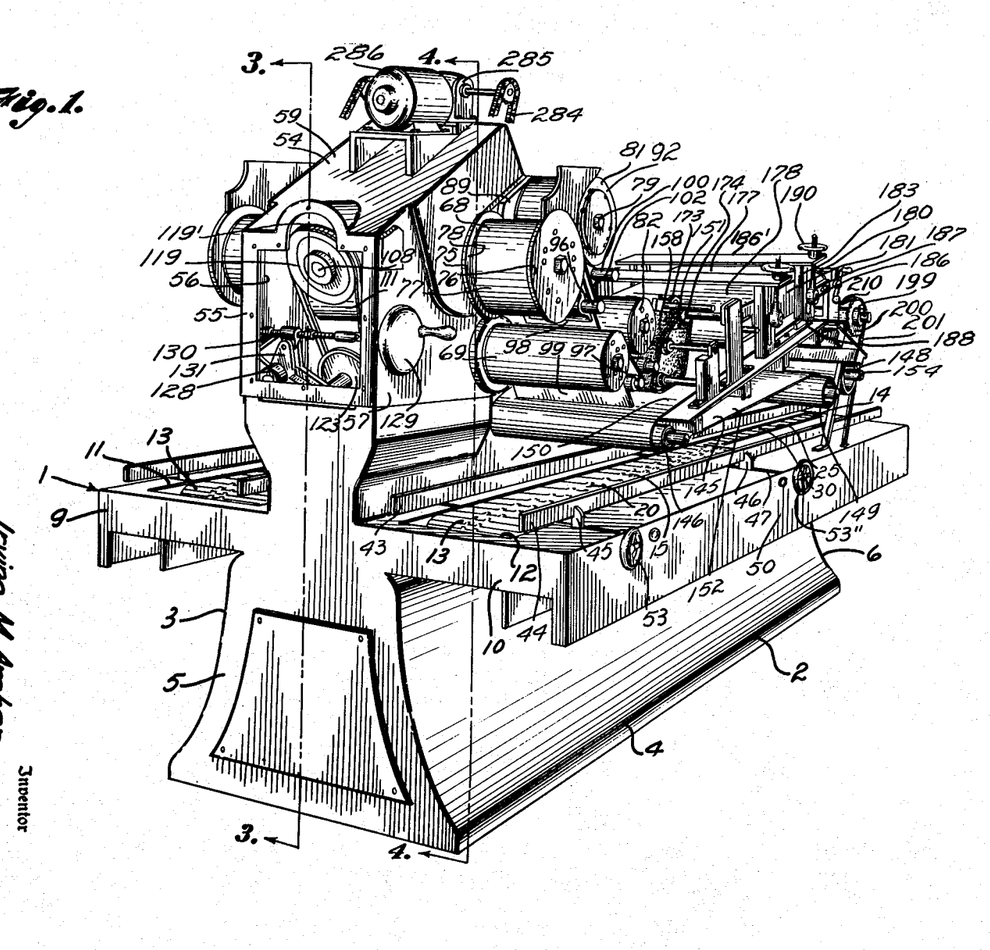
Fig. 1 is a perspective view of a dough molding machine embodying the features of the present invention, the cover plate on the housing of the driving mechanism, and the dough ball feeding mechanism being removed to better illustrate a part of the drive.

Mounted on the respective side walls 56 and 57 are fixed bearings 62 registering with suitable openings 63 therein for journaling upper and lower transverse shafts 64 and 65, the shaft 65 being located below and forwardly of the shaft 64. The outer ends 66 of the shafts are of reduced diameter to provide stop shoulders 67. The ends of the shafts thus overhang the upper runs of the conveyors previously described. Mounted on the projecting ends of the shafts are composite rolls 68 and 69 each including a cylindrical body portion 70 having bores 71 to receive the ends 66 of the shafts and which are provided with keyways 72 for keys 73 in the ends of the shafts as shown in Fig. 6. Attached to the ends of the body portions of the rollers by fastening devices such as screws 74 are end plates 75 and 76 to retain sleeves 77 that are formed of a material to prevent sticking of the dough. The sleeves 77 are preferably of plastic material, known as "Teflon." This material is produced by polymerizing gaseous tetrafluorethylene to yield a solid granular polymer from which sheet stock suitable for fabrication of the sleeves is formed. The plates for the upper rolls have annular flanges 78. The lower rolls 69 on the lower shafts 65 are of somewhat similar construction but smaller in diameter and of longer length as shown in Fig. 1. The lower rolls 69 also have a circumference of their end plates in registry with the outer circumference of the rolls. The rolls are retained on the ends of their respective shafts by clamping them against the shoulders 67 by cap screws 79 that are threaded into internally threaded sockets 80 in the ends of shafts and which have heads 79' engaging the outer plates 76. With this construction the rolls are readily removed for inspection or replacement with rolls of different size if desired. Cooperating with the rolls 68 and 69 are adjustable rolls 81 and 82 that are carried on the ends of the shafts 83 and 84.

The side walls 56 and 57 are provided forwardly of the bearings 62 with dovetail recesses 85 and 86 to slideably mount plates 87 and 88 carrying bearings 89 as shown in Fig. 6, which bearings register with openings 90 in the plates and with slots 91 extending through the side walls to mount the shafts 83 and 84 corresponding with the fixed shafts 64 and 65 previously described. The shafts 83 and 84 are of the same construction as the fixed shafts and the rolls are mounted thereon in the same manner as the rolls 68 and 69. The upper rolls 81 are of substantially the same construction as the upper rolls 68 with the exception that the flanges on the end plates are eliminated and the end plates are provided on their outer sides with annular shoulders 92 whereby the rollers 81 operate between flanges 78 forming passes 94 therebetween and having closed sides through which the balls of dough are passed to the lower complementary rolls as hereinafter described. The lower rolls each of identical construction are positioned so that the adjacent sides form passes 95 therebetween in registry with the closed passes 94 of the upper pairs of rolls as shown in Fig. 4.

Projecting from the sides 56 and 57 of the housing in downwardly spaced relation from the fixed rolls are rods 96 and 97 carrying scraper blades 98 and 99 which form lower guides for the dough that is fed through the passes between the respective rolls as shown in Fig. 4. Similarly projecting from the slide plates 87 and 88 are rods 100 and 101 carrying scraper blades 102 and 103 in tangential contact with the under side of the adjustable rolls as shown in Fig. 4.

The rolls just described are continuously driven to feed balls of dough downwardly therebetween. Both sets of upper rolls are driven at a differential speed with respect to the lower rolls and the shafts thereof carry worm gears 104 and 105 respectively that mesh with worms 106 and 107 fixed to a countershaft 108 having one end journaled in a bearing 109 in the wall 58 and the other end journaled in a bearing 110 carried in a partition 111, that extends between the side walls as shown in Fig. 3 and which cooperates with a bottom 112 to form a lubricant chamber 113.

The lower shafts are provided with smaller worm gears 114 and 115 that mesh with worms 116 and 117 on a countershaft 118 mounted in the partition 111 and end wall 58 similarly to the countershaft 108. The countershafts project from the outer side of the partition and carry pulleys 119 and 120 respectively. The pulley 120 for the lower shaft is actuated by belts 121 operating thereover and over a pulley 122 mounted on the armature shaft of the motor 7 at the end opposite the pulleys 39 and 40 whereby the lower rolls are driven at a constant uniform speed depending upon the ratio of the worm gears and sizes of the respective pulleys. The pulley 119 is operated from a variable speed pulley 123 of any conventional type by a belt 119'. In the illustrated instance, the variable speed pulley has fixed outer flanges 124 and an axially shiftable flange 125 which are tapered on their adjacent sides as indicated at 126. The flange 125 is shifted to and from the outer flanges to vary the contact diameters of the driving belt 127 and the driven belt 119' and thereby varying the speed of the shaft 108 relatively to the shaft 118. The variable speed pulley is suitably mounted on a bracket 128 that is carried from the side walls 56 and which extends inwardly of the housing. The adjustment of the center flange of the pulley is effected by a hand wheel 129 that is connected with the operating mechanism of the pulley by a threaded nut 130 and a bell crank connection 131, the specific structure of which forms no part of the present invention. The belt 127 operating over the variable speed pulley is actuated by a pulley 132 which is also mounted on the armature shaft of the motor 7 adjacent the pulley 122. With this arrangement it is obvious that the lower head rolls are operating at a constant speed while the upper head rolls may be operated at differential speeds upon turning of the hand wheel 129. Since the shafts 83 and 84 are movable to and from the shafts 64 and 65 the worms 107 and 117 are of sufficient length to maintain contact with the worm gears 105 and 115.

Figure 5:
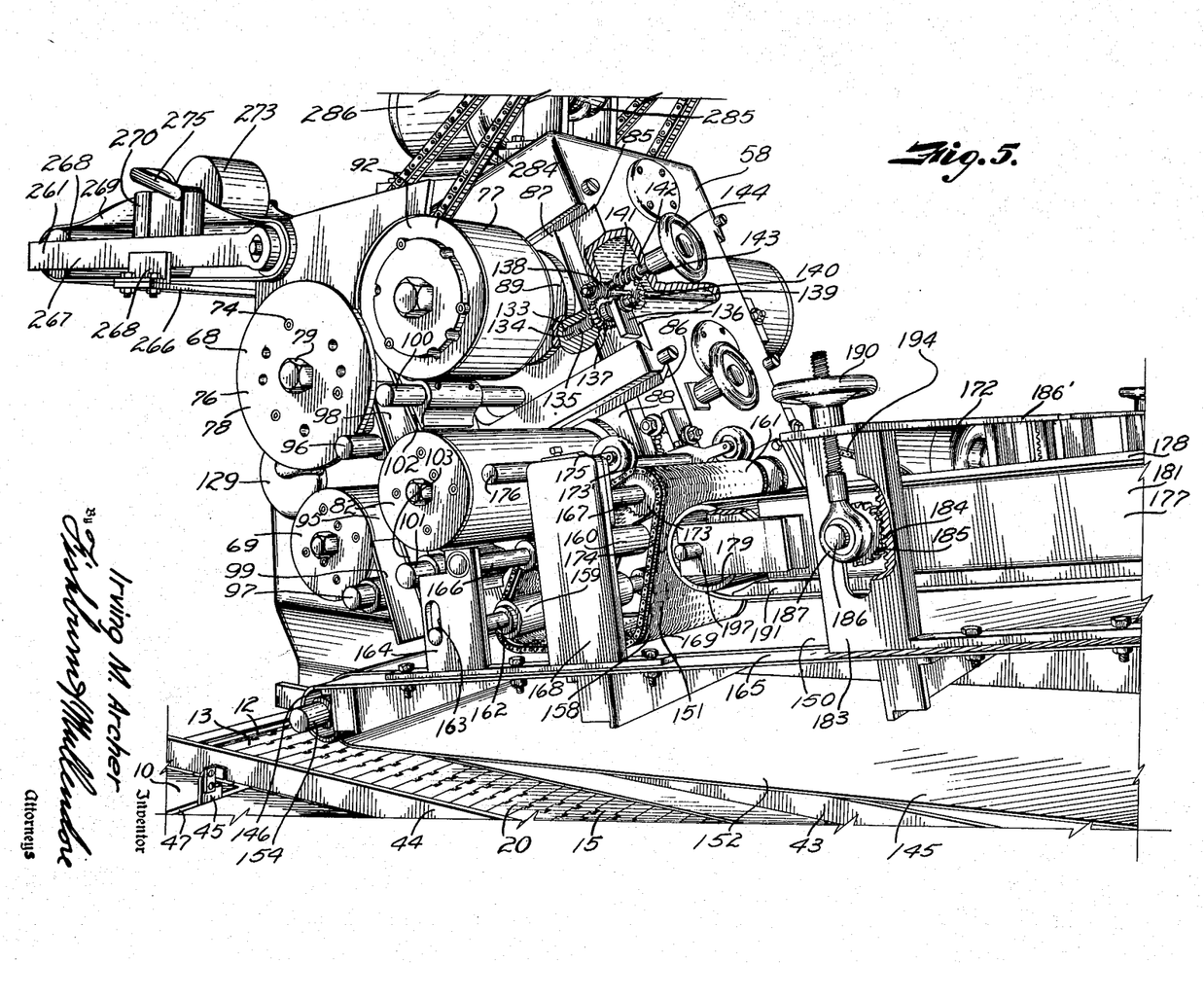
Fig. 5 is an enlarged perspective view of the dough sheeting head and rear portion of the rolling mechanism.

In order to effect movement of the movable head rolls with respect to the fixed head rolls, the plates 87 and 88 on the respective sides of the housing have the forward edge portions thereof provided with internally threaded sockets 133 for receiving the threaded ends 134 of adjusting shafts 135 the outer ends of which are rotatably fixed within bearing blocks 136 as shown in Fig. 5, the blocks 136 being secured in a fixed position to the side walls of the housing. In order that the shafts for both sides may be simultaneously operated each shaft is provided with a worm gear 137 that meshes with worms 138 on the ends of a cross shaft 139 which is suitably journaled in the side walls of the housing. Mounted within the housing are worm gears 140 that mesh with worms 141 on shafts 142, the adjusting shafts 142 being journaled in bearing openings 143 in the end wall 58 to mount hand wheels 144 on the exterior side of the housing.

Located above each of the lateral tables and below the head rollers is an endless belt 145 adapted to operate over laterally extending pulleys 146, 147, 148 and 149. The pulleys 146 and 147 are shown arranged so that the upper run 150 of the belt carries the sheets of dough discharged from the head rolls through an upwardly inclined plane while the sheets of dough are being acted upon by a curling and rolling mechanism 151 hereinafter described. The upper runs of the belts move downwardly from the pulleys 147 and over the pulleys 148 to discharge the rolled sheets of dough into the pans as they are delivered along the tables previously described. The upper run of the belt might be arranged horizontally from the pulley 146 if desired without materially changing the operation thereof. The under runs 152 of the belts are carried above the path of the pans by the pulleys 149. The pulleys for the belts 145 are supported from forwardly extending wings 153 of the machine frame and the shafts 154 for the pulleys may extend thereacross whereby the conveyor belts 145 on the respective sides of the machine are operated in synchronism. The belts are driven from the shaft 154 for the pulleys 148. This shaft carries a sprocket 155 that is connected with a sprocket 156 on the power shaft of the speed reduction unit by an endless chain 157 as shown in Fig. 3.

The dough curling and rolling mechanism 151 includes sections of chain that drop upon the upper run of the conveyor belts 145. In the illustrated instance, this is attained by an endless chain belt 158 that operates over rollers 159, 160 and 161. The roller 159 is floatably mounted with the shaft 162 thereof operating in slots 163 in brackets 164 that extend upwardly from a table 165 which supports the upper run of the belts 145 as best shown in Fig. 5. The roller 160 has a fixed support on the shaft 166 also carried by the brackets 164 above and forwardly of the floating roller. The roller 161 is carried above and forwardly of the roll 160 on a shaft 167 carried by upwardly extending arms 168 that are attached to the table 165. The rollers thus arranged provide loose runs 169 for the chain belts 158 so that as the belts 145 carry the forward edges of the sheets of dough under the chain sections 169 bear thereon and start curling of the sheeted dough to form rolls reversely to the direction of travel of the belts 145. The shaft 167 is actuated by a worm gear 170 thereon meshing with a worm 171 on the operating shaft of a motor 172. The chain belts are kept in contact with the sprockets 173 at the ends of the upper rolls by pressure rollers 173' that bear on chains 174 at the sides of the belts and which are carried by arms 175 projecting from a transverse shaft 176.

Figures 2, 8:
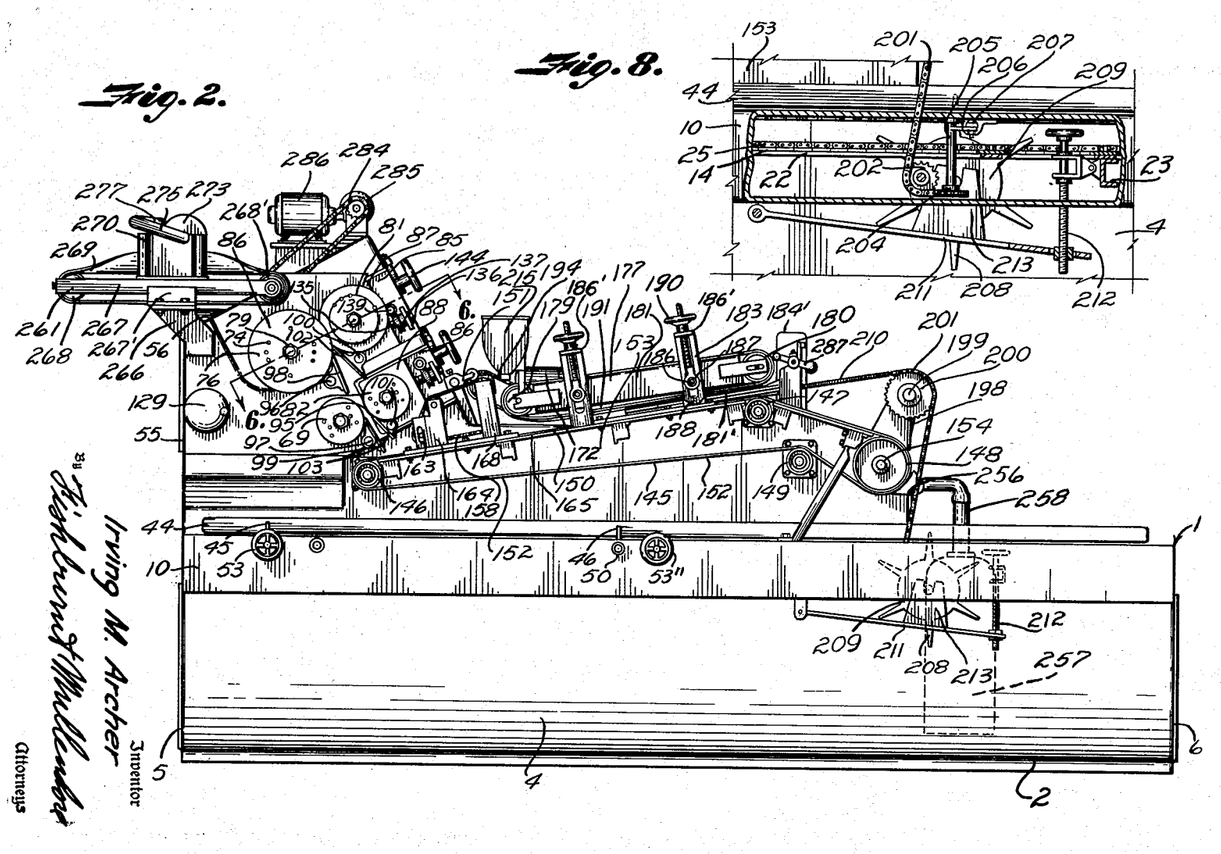
Fig. 2 is a side elevation of the machine.
Fig. 8 is a detailed section through one of the pan controlling mechanisms.
Figures 14, 15:
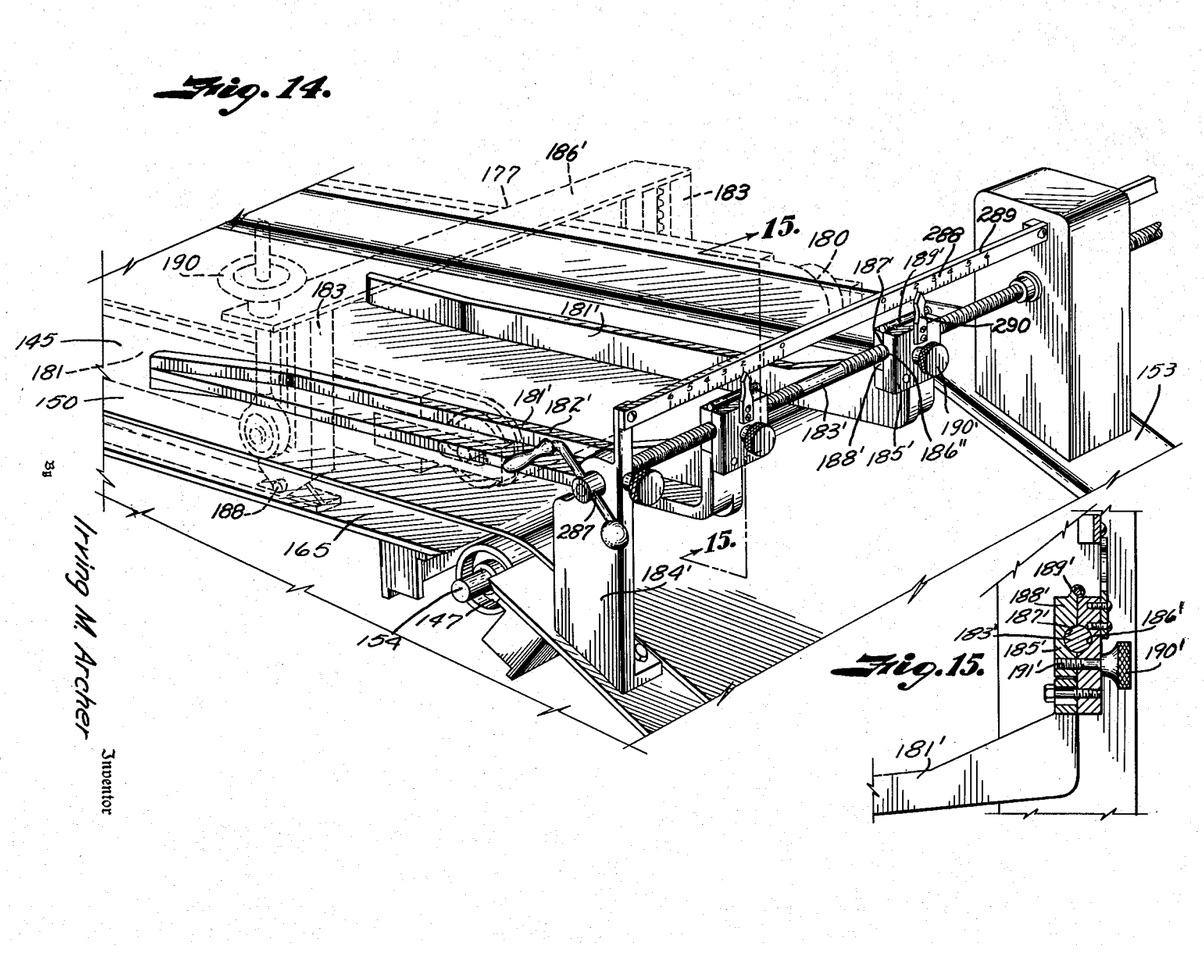
Fig. 14 is a perspective view of the guides for sizing the length of the rolled dough.
Fig. 15 is a detail section on the line 15—15 of Fig. 14.

The pressure board mechanisms for tightening the roll of the dough are designated 177. These mechanisms include endless belts 178 operating over spaced pulleys 179 and 180 that are mounted at the ends of frames 181. The frames 181 are carried in spaced relation with respect to the upper run of the belts 145 by pairs of posts 183, one pair being pivotally connected with and projecting upwardly from the conveyor table as indicated at 188 (Figs. 2 and 3). The posts 183 have vertically positioned toothed racks 184 forming tracks for gears 185 that are carried on transverse shafts 186 journalled in the respective ends of the frames 181. Jack screws 187 extend upwardly adjacent the posts 183 at the outer sides of the frames 181 and have heads in connection with the adjacent ends of the shafts 186. The threaded upper ends 182 of the jack screws are axially movable through suitable openings in the ends of cross members 186' that connect the upper ends of the posts and mount hand wheels 190 that are threadably engaged therewith and seat upon the outer ends of the cross members 186'. Since the jack screws 187 are axially slideable within the openings of the cross members 186', the pressure boards may move upwardly to allow passage of larger dough rolls known as doubles. By rotating the hand wheels, the frames are raised and lowered and kept in horizontal relation by the gears 185 rolling on the toothed racks 184. The transverse shafts 186 are initially adjusted for level position through vertical adjustment of the racks on the inner sides of the pressure board frames 181. Pressure is effected on the middle portion of the rolls of dough and presses any entrapped air outwardly toward the ends thereof as well as to effect lengthening of the dough rolls, the under side of the horizontal frame carrying a backing plate 191 for the lower run of the belt. The backing plates have relatively thick mid-portions 192 at their forward ends which taper upwardly toward the sides as best shown in Fig. 7. The pressure belts are driven from the shafts 161 by a chain 194 operating over sprockets 195 on the shafts 161 and over sprockets 196 that are fixed to the shafts 197 which carry the foremost rolls of the pressure conveyors. The pressure conveyors are also adjusted so that the passageways thereunder become shallower toward the outlet to gradually increase pressure and tightening of the dough rolls. This adjustment is effected by turning the hand wheel 190 to position the shaft 186 that is carried by the pair of pivoted posts 183. During this adjustment the pressure board mechanism 177 pivots on the other shaft 186 and the pivoted posts rock upon their pivots. Means is provided for pressing inwardly the ends of the rolls and to limit the elongation thereof. This means comprises spaced arms 181' that are supported between the pressure board and the upper run of the conveyor belt 145 as shown in Fig. 14. The arms include parallel portions 182' which ride upon the belt 145 and have diverging forward ends to facilitate entrance of the rolls of dough therebetween so that their ends roll in contact with the parallel portions of the arms and are shaped thereby. The arms are supported at their rear ends by a transverse shaft 183' having its ends journalled in brackets 184' carried upon the main frame of the molder on opposite sides of the belts 145. The shafts 183' have right and left threads on the respective ends thereof to mount threaded upturned ends 185' of the arms 181'. The upturned ends of the arms have transverse threaded grooves 186" which cooperate with complementary grooves 187' in plates 188' that are connected with the arms by hinge joints 189' so that the plates may be opened to place the arms on the shafts in desired position with respect to travel of the rolls of dough. The plates are secured in closed relation by screws 190' having shanks 191' journalled in a part of the arms and threaded into the plates as shown in Fig. 15. The shafts are rotated to adjust the arms to and from each other by cranks 287.

In order that the pans may be momentarily detained below the discharge of the conveyor belts, gates 198 are pivotally suspended on cross-shafts 199 so that when a roll of dough contacts the gates, the gates will swing outwardly to rock the shafts 199. Rocking of the shafts 199 effects movement of sprockets 200 that are fixed thereon to exert pull on chains 201. The chains 201 also operate over sprockets 202 that are carried by the base frame. The chains 201 are connected with wheels 204. The wheels 204 are carried by vertical shafts 205 journalled in the tables 9 and 10 and which have arms 206 connected with rods 207, the inner ends of which are normally retained in contact with teeth 208 on star wheels 209 through action of springs 210 that are attached to the free ends of the chains 201. The star wheels 209 are supported in position to engage the pans by means of lever arms 211 that are pivoted to the sides of the base frame and which have their forward ends adjustably supported on adjusting screws 212 that are carried by yokes secured to cross-bars supported by the main frame as shown in Fig. 4. The star wheels are journalled to operate between the spaces of the divided conveyors and are journalled in bearings 213 that are carried by the lever arms 211.

Hoppers 215 are carried above the forward end of the pressure belts to apply dusting flour thereto and prevent possibility of sticking of the rolls of dough on the pressure or conveyor belts.

Dusting flour and pieces of dough are removed from the belts 145 by vacuum nozzles 256 that are supported across the delivery ends thereof and which are connected with a container 257 by ducts 258.

Figures 11, 12, 13:
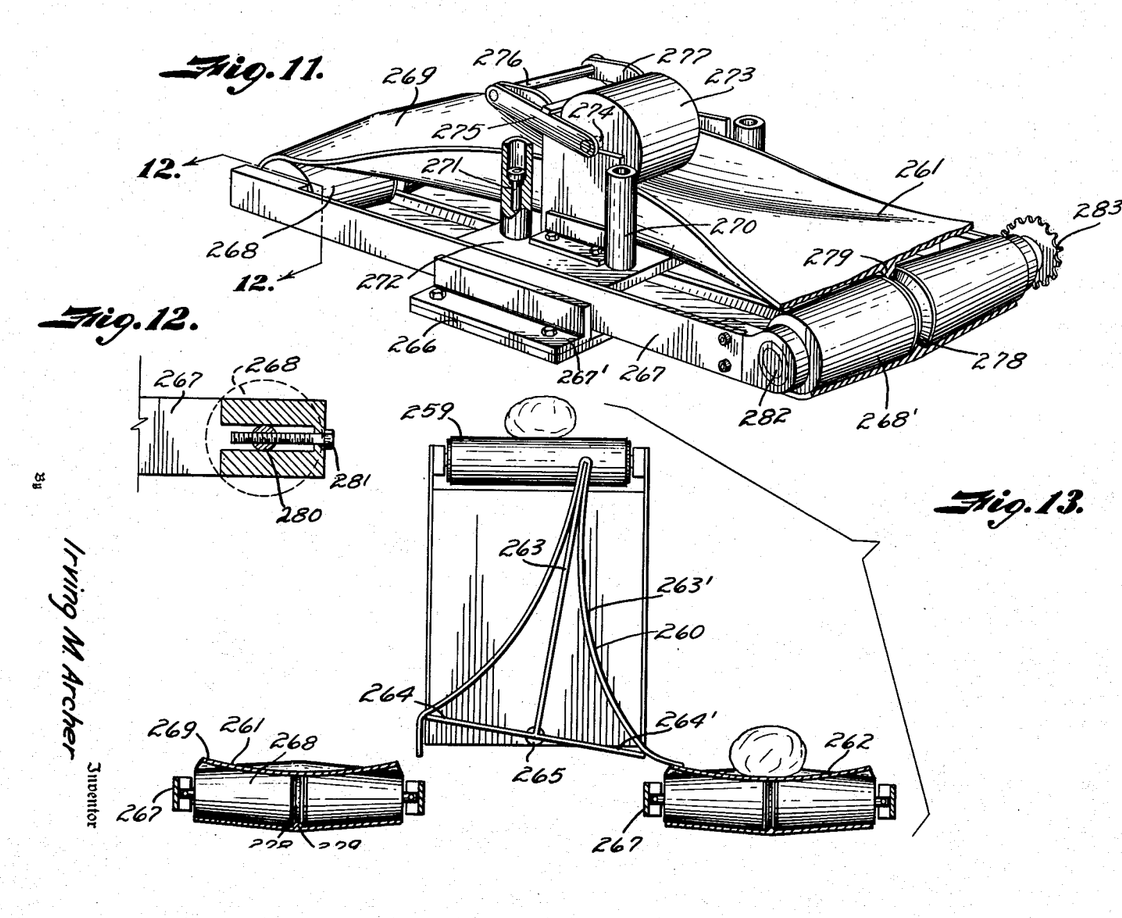
Fig. 11 is a perspective view of one of the dough ball feeding conveyors.
Fig. 12 is a fragmentary section on the line 12—12 of Fig. 11.
Fig. 13 is an end view showing the device for discharge of the dough balls alternately out the ball feed conveyors.

The balls of dough may be delivered from the proofing machine to the molder by a conveyor 259 which discharges onto an oscillatory distributor 260 that rocks laterally in opposite directions to deposit balls of dough onto conveyors 261 and 262 which in turn feed the balls of dough into the closed passes of the upper rolls. The distributor includes a vertical blade 263 and horizontal arms 264 and 264' extending from a pivot shaft 265 in the direction of the respective conveyors 261 and 262. Extending over the upper edge of the blade and draped over the ends of the arms is a sheet of resilient material 263' to cause the balls of dough to roll upon the respective conveyors and prevent sticking of dough to the distributor. In operation the vertical blades rock past vertical position so that when a ball of dough rolls down the inclined side onto one feed conveyor, the weight thereof on the lateral arm tilts the device in the opposite direction and the following ball of dough is delivered onto the other conveyor. It is thus obvious that the balls of dough are delivered alternately to the molding heads of the machine.

The feed conveyors are mounted on a bracket 266 carried by the gear housing 54, the bracket carrying a transverse plate to which the side members 267 of the conveyor frames are attached by angles 267' (see Figs. 4 and 11). The side members 267 of each frame carry rollers 268 and 268' at the respective ends. Operating over the rollers are feed belts 269 having upper runs curved transversely in the form of a trough through which the balls of dough must pass to center the balls with respect to the roll passes between the sets of upper rolls and to restrict the transverse diameter of the balls to a width so that they correspond to the width of the closed passes. The trough-like shape is produced by vertically positioned rollers 270 which engage the side edges of the belts as shown in Fig. 11. The rollers 270 are journalled on pins 271 that are carried on transverse plates 272 interconnecting the side members 267 of the respective frames. The balls of dough are kept in the bottom of the trough-like runs of the conveyors by pressure rollers 273 that are rotatable upon transverse shafts 274 carried by arms 275 pivotally supported on cross shafts 276, the cross shafts being carried by brackets 277 upon the transverse plates 272. The pressure rollers prevent the balls of dough from riding out of the trough-like portions and assure that the balls are no wider than the enclosed passes of the upper sets of molding rolls.

The belt rollers 268 and 268' are slightly crowned and provided midway of their length with grooves 278 in which ribs 279 on the inner faces of the belts operate to retain the belts centrally thereof.

The belts are tightened by adjusting the shafts 280 of the foremost rollers 268 in the side members of the frames by adjusting screws 281 best shown in Fig. 12. The rollers 268' are fixed to shafts 282 having sprockets 283 that are driven by chains 284 from a speed reduction gearing 285 which is operated by a motor 286 as shown in Figs. 2 and 4.

Assuming that the machine, constructed as described, is installed in connection with the discharge conveyor 259 of a proofing machine, the machine is first adjusted to the size of the pans to be used. This is effected by manipulating the hand wheels 53 in the proper directions to space the pan guides 43 and 44. The hand wheels 53' are then actuated so as to retain the pans on the conveyors to move both guides relatively to the pan conveyors 20 in positions to receive the rolls of dough centrally of the pans. The jack screws 212 at the respective sides of the machine are then adjusted so that the teeth or lugs 208 of the wheels 209 properly enter the spaces between the strapped pans to stop the pans when a pan is in position to receive discharge of dough from the conveyor belts 145.

The head rolls 81 and 82 are then adjusted relatively to the fixed head rolls to result in sheeting the balls of dough to a desired width and thickness. This adjustment is effected by turning the hand wheels 144 in the proper direction so that the worms 141 will operate the shafts 139 through the worm gears 140 to turn the worms 138 and worm gears 137 which rotates the threaded shafts 135 and shifts the plates 87, thereby adjusting the dough passes of the head rolls. The pressure mechanism is then adjusted relatively to the upper runs 150 of the conveyor belts 145 so that the desired pressure is applied to the rolled sheets of dough. This adjustment is effected by rotating the hand wheels 190 in the proper direction to lower or raise the frames 181 relatively to the frame of the machine. The dough roll guide arms 181' are adjusted apart to maintain the desired length of the dough rolls and to smooth off the ends thereof. This adjustment is effected by turning the supporting shaft 183' by means of the cranks 287 (Fig. 14). If desired, a graduated scale 288 may be provided on cross bars 289 that are carried by the brackets 184' and a block secured on wing 153, wherein the intermediate position of shaft 183' is journaled and over which pointers 290 on the upturned ends of the arms move when the cranks are turned. The pointers and scales thus facilitate positioning the arms to give the desired length and end shape of the rolls of dough.

With the motor 7 in operation the belts 42 drive the speed reducing mechanism 8 to actuate the pan conveyors for effecting movement of the pans. The chain 157 is then operating the conveyor belts 145. The lower head rolls 69 and 82 are being operated by the belts 121. The upper sets of head rolls are also being operated through the belts 127 and 119'. As above described, the upper head rolls may be operated at differential speeds relatively to the lower head rolls to control drawing out of the dough as well as the thickness and width of the resulting sheets. This is effected by adjusting the variable speed pulley 123 by turning the hand wheel 129 at the side of the gear case. Sets of strapped pans are then placed in successive order on the pan conveyors by an operator located at the respective sides of the machine. The pans are moved forwardly by the conveyors 13 and on to the divided conveyors 14 where the foremost pans are stopped by the toothed wheel 209 since the wheels are stopped from rotation by the rods 207. The first set of pans being detained by the wheels 209, provide stops for the succeeding sets of pans and the pans are advanced only as the wheels 209 are permitted to rotate which rotation is under control of the rolls of dough discharged from the conveyor belts 145.

The balls of dough are delivered from the proofing machine by the conveyor 259 to be delivered alternately to the respective feed conveyors 261 and 262 which carry the balls of dough into the upper pairs of head rolls at the respective sides of the machine. The balls of dough are reduced in width by the trough-like passes of the feed conveyors so that they pass into engagement with the upper sets of the head rolls and are pushed through the closed passes 94 for conversion into sheets of a width conforming with the space between the flanges 75 of the head rolls 68. The sheets of dough are passed downwardly over the plates 98 at a speed substantially corresponding with the speed of the upper head rolls, until the forward edges are engaged between the lower set of head rolls which pass the dough at, for example, greater speed to continue the sheeting operation.

It is apparent that the relative speeds between the upper and lower pairs of head rolls will determine the final width and thickness of the sheets of dough. If the dough is sheeted thick by the upper head rolls, and thin in the lower head rolls the dough will come out considerably wider than if it is sheeted thin in the upper head rolls and not much thinner in the lower head rolls. Consequently, the width of the sheeted dough is controlled by the thickness settings between the upper and lower head rolls, as well as the rate at which the dough is fed from the upper head rolls to the lower head rolls. For example, if the upper head rolls feed the dough rapidly to the lower head rolls, the dough will be advanced on the lower head rolls and will sheet wider than if the dough is fed more slowly from the upper head rolls to the lower head rolls.

It is obvious that by using both sets of head rolls greater time may be allowed for drawing out the sheets of dough than would be the case if only a single set of head rolls were employed. Consequently the dual or simultaneous sheeting of the balls of dough on the respective sides of the machine permits proper working time and prevents rupturing or damage to the sheets of dough that would ordinarily result in bad makeup and imperfect loaves of bread.

Figure 9:
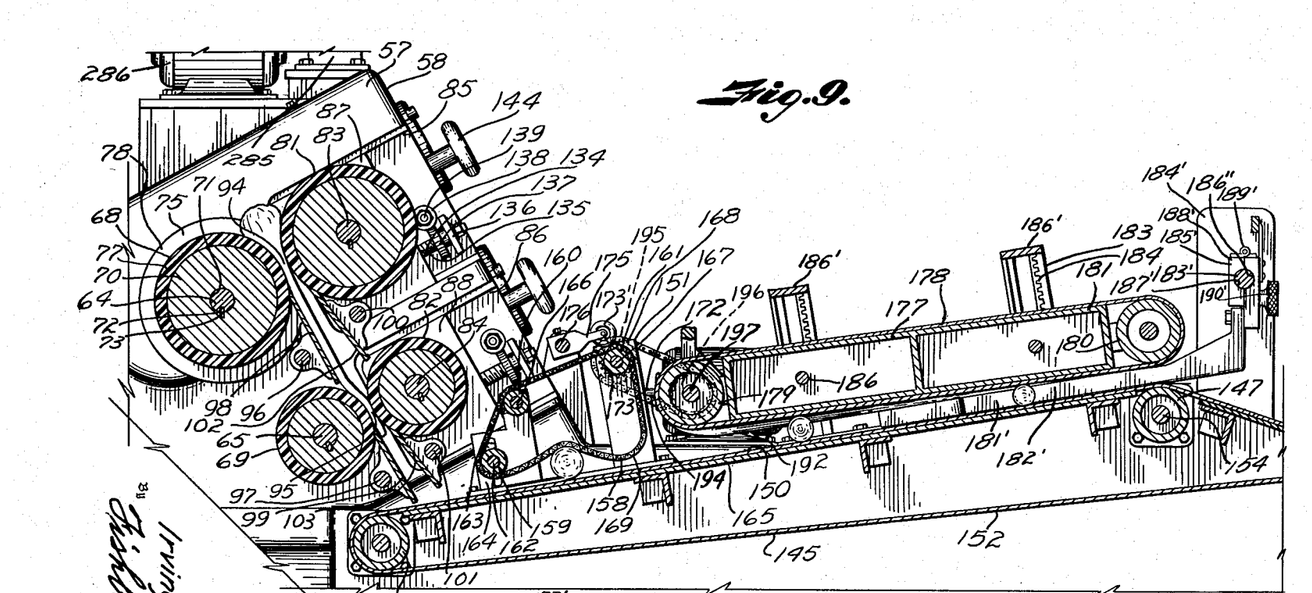
Fig. 9 is an enlarged section through the dough sheeting, rolling and pressing mechanisms.

The sheets of dough on passing down the plates 99 contact the upper run 150 of the conveyor belts 145 and the sheets are carried thereby under the chain belts 158 which are being actuated in countermovement to the belts 145 with the result that the forward edges of the sheets are curved retractively and the sheets of dough begin to roll upon themselves as they pass under the depending loop portions of the curling chains as shown in Fig. 9. Upon passage from under the chains the rolls of dough are relatively loose and they are then carried under the pressure mechanisms consisting of the countermoving belts 178. The lower runs of these belts being supported relatively to the upper runs of the conveyors 145, apply pressure to the rolls and the shape of the pressure board 192 effects lengthening of the rolls and works or presses entrapped air out the ends of the rolls as the pressure is gradually applied by reason of the restricted passageway through which the rolls of dough are moved. When the rolls of dough pass between the arms 181' the ends are pressed inwardly to restrict elongation and shape the ends thereof. By driving the pressure belts at a speed one-half of the main conveyor belts 145 the effective lengths of the pressure mechanism are doubled, that is, the pieces of dough will roll over and over during their carriage by the belts 145. After the rolls of dough pass from beneath the pressure boards 192 they move forwardly in successive order until the foremost rolls reach the gates 198. The pressure of the pieces of dough then bearing on the gates causes the gates to swing outwardly rocking the shafts 199 and exerting pull on the chains 201 to effect withdrawal of the rods or bolts 207 to allow forward movement of the pans as the discharged rolls drop thereinto. After passage of the rolls the gates return to their original position and the rods 207 are thereby engaged with succeeding teeth of the control wheels 209 again stopping the pans until other rolls of dough are in position to be discharged. When a set of pans is filled, they may be discharged onto an offtake conveyor or manually removed by operators standing at the discharge end of the machine. The belts 145 are kept clean and free of dusting flour, fragments of dough and the like by the suction through the nozzles 256 which carries the refuse into the container 257. It is obvious that the passes between the head rolls are open for inspection and observation of the action of pieces of dough passing through the machine. It is further obvious that the respective driving mechanisms are also enclosed within suitable housings at the center of the machine and are out of contact with the dusting flour or particles of dough. Consequently, the machine may be kept in sanitary condition and there is less possibility of contamination of the completed rolls of dough.

From the foregoing it is obvious that I have provided a combination dough molding and panning machine that is of simple construction and which has sufficient capacity to conform with the capacity of a proofing machine with which it is associated.

What I claim and desire to secure by Letters Patent is:

1. A molding machine including a frame, a dough carrying conveyor extending along the frame, a pressure board, pressure board supports carried by the frame on opposite sides of the dough carrying conveyor at respective ends of the pressure board, toothed racks on the supports, transverse shafts carried by the pressure board, gears on the ends of the transverse shafts meshing with the toothed racks, threaded shafts journalled in the supports at one side of the pressure board and connected to said pressure board, and operating means carried by said supports and having threaded connection with the threaded shafts for independently raising and lowering the ends of the pressure board relatively to the dough carrying conveyor to support the pressure board at an angle to the dough carrying conveyor for determining the pressure and time that the dough is acted upon by the pressure board while being carried on the carrying conveyor.

2. A molding machine including a frame, a dough carrying conveyor extending along the frame, a pressure board, pressure board supports carried by the frame on opposite sides of the dough carrying conveyor at respective ends of the pressure board, toothed racks on the supports, transverse shafts carried by the pressure board, gears on ends of the transverse shafts meshing with the toothed racks, threaded shafts journalled in the supports at one side of the pressure board and connected to said pressure board, and operating means carried by said supports and having threaded connection with the threaded shafts for independently raising and lowering the ends of the pressure board relatively to the dough carrying conveyor to support the pressure board at an angle to the dough carrying conveyor for determining the pressure and time that the dough is acted upon by the pressure board while being carried on the carrying conveyor, said threaded shafts being slidable in journals in said supports for raising the pressure board by larger dough rolls known as doubles when doubles happen to pass under the pressure board.

3. In a molding machine, a frame, a dough carrying conveyor extending along the frame, a pressure board, a pair of pressure board supports carried by the frame at each end of the pressure board, transverse shafts carried by the pressure board, means vertically movable on the supports and carrying the ends of the transverse shafts for independently raising and lowering the ends of the pressure board relatively to the dough carrying conveyor to support the pressure board at an angle to the dough carrying conveyor for controlling the pressure and time that the dough is acted upon by the pressure board while the dough is carried on the carrying conveyor, one pair of said supports being rigidly carried on the frame and the pressure board being pivoted on the transverse shaft associated with the rigid supports, and means pivotally mounting the other pair of supports on the frame to accommodate said supports to the angular adjustment of the pressure board.

4. In a molding machine, a frame, a dough carrying conveyor extending along the frame, a pressure board, pairs of pressure board supports carried by the frame at each end of the pressure board, transverse shafts carried by the pressure board, shaft journals vertically adjustable on the supports and carrying the ends of the transverse shafts for independently raising and lowering the ends of the pressure board relatively to the dough carrying conveyor to support the pressure board at an angle to the dough carrying conveyor, an endless belt having a run movable under the pressure board in cooperation with the dough conveyor to work the dough, one pair of said supports being rigidly carried on the frame and the pressure board being pivoted on the transverse shaft associated with the rigid supports, means pivotally mounting the other pair of supports on the frame to accommodate said supports to the angular adjustment of the pressure board, and driving means for actuating the dough carrying conveyor and the endless belt at different speeds to cooperate with the angular position of the pressure board to control the time that the dough is retained under the pressure board.

5. In a molding machine, a frame, a dough carrying conveyor extending along the frame, a pressure board, pairs of pressure board supports carried by the frame at each end of the pressure board, transverse shafts carried by the pressure board, shaft journals vertically adjustable on the supports and carrying the ends of the transverse shafts for independently raising and lowering the ends of the pressure board relatively to the dough carrying conveyor to support the pressure board at an angle to the dough carrying conveyor, an endless belt having a run movable under the pressure board in cooperation with the dough conveyor to work the dough, one pair of said supports being rigidly carried on the frame and the pressure board being pivoted on the transverse shaft associated with the rigid supports, means pivotally mounting the other pair of supports on the frame to accommodate said supports to the angular adjustment of the pressure board, and driving means for actuating the dough carrying conveyor and the endless belt at different speeds and in opposite directions to cooperate with the angular position of the pressure board to control the time that the dough is retained under the pressure board.

6. In a dough molding machine, a frame, a dough carrying conveyor extending along the frame, a pressure board, pairs of pressure board supports carried by the frame on opposite sides of the dough carrying conveyor at respective ends of the pressure board, toothed racks on the supports, transverse shafts carried by the pressure board, gears on the ends of the transverse shafts meshing with the toothed racks, threaded shafts journalled in the supports at one side of the pressure board and having connection with said transverse shafts, operating means carried by the supports and having threaded connection with the threaded shafts for independently raising and lowering the ends of the pressure board relatively to the dough carrying conveyor to support the pressure board at an angle to the dough carrying conveyor for determining the pressure and time that the dough is acted upon by the pressure board while being carried on the carrying conveyor, one pair of said supports being rigidly carried on the frame and the pressure board being pivoted on the transverse shaft associated with the rigid supports, and means pivotally mounting the other pair of supports on the frame to accommodate said supports to angular adjustment of the pressure board.

References Cited in the file of this patent

UNITED STATES PATENTS

| | | |
|---|---|---|
| 795,581 | Corby | July 25, 1905 |
| 1,178,674 | Pletscher | Apr. 11, 1916 |
| 1,334,024 | Embrey | Mar. 16, 1920 |
| 1,339,087 | Artkop | May 4, 1920 |
| 1,601,781 | Van Houten | Oct. 5, 1926 |
| 1,753,393 | Van Houten | Apr. 8, 1930 |
| 1,781,546 | Harber | Nov. 11, 1930 |
| 1,870,256 | Lauterbur et al. | Aug. 9, 1932 |
| 1,890,740 | Marasso | Dec. 13, 1932 |
| 2,075,012 | Baker | Mar. 30, 1937 |
| 2,402,420 | Le Sage | June 18, 1946 |
| 2,425,356 | Sticelber | Aug. 12, 1947 |
| 2,431,073 | Palmer | Nov. 18, 1947 |
| 2,450,033 | Cohen | Sept. 28, 1948 |
| 2,534,734 | Rhodes | Dec. 19, 1950 |
| 2,631,549 | Rhodes | Mar. 17, 1953 |